July 13, 1965  D. G. BLACK, JR  3,194,142
OPTICAL IMAGE TRANSFER DEVICE
Filed Sept. 26, 1963
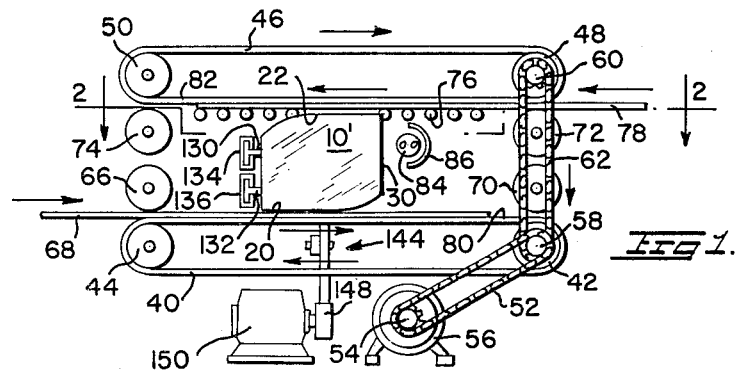
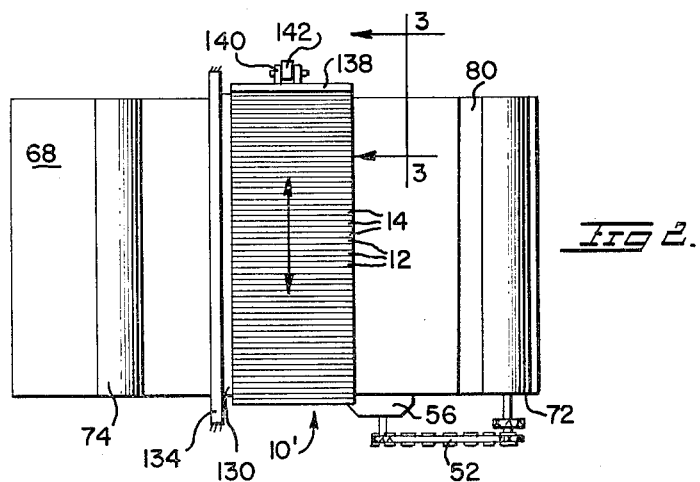
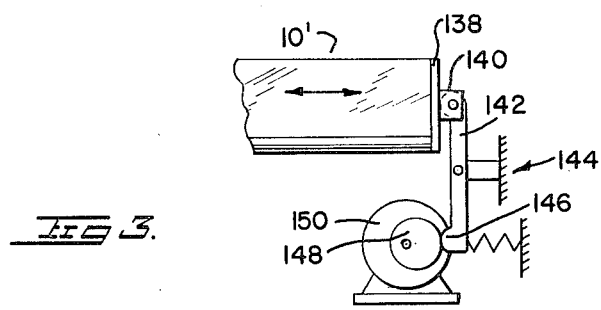
INVENTOR
DAVID G. BLACK, JR.
BY *Stowell & Stowell*
ATTORNEYS

United States Patent Office 3,194,142
Patented July 13, 1965

3,194,142
OPTICAL IMAGE TRANSFER DEVICE
David G. Black, Jr., North Scituate, R.I., assignor to Mosaic Fabrications, Inc., Southbridge, Mass., a corporation of Massachusetts
Filed Sept. 26, 1963, Ser. No. 311,876
1 Claim. (Cl. 95—75)

This invention relates to an optical image transfer device and more particularly to a copying machine employing an optical device formed of a plurality of light conducting plates arranged in parallel relationship.

In copending application Serial No. 154,648, filed November 24, 1961, by John W. Hicks, Jr., and assigned to the same assignee to which this application is assigned, a copying device employing such an optical image transfer element is disclosed. In that application, there is disclosed a method of making such an optical image transfer device and further how to employ such a device in a copying machine.

In the manufacture of an optical device formed of a plurality of light conducting plates arranged in parallel relationship, it sometimes occurs that the device is defective either by reason of optical imperfections in one or more of the plates, or by reason of improper bonding of the plates to the light-insulating plates of lower index of refraction, or by reason of improper grinding and polishing at the edge portions thereof which form reflecting or light transmitting surfaces. A flaw in one or more of the light transmitting plates or the light-insulating plates results, in the case of a copying machine of the type disclosed in the above-identified application, in what is known as striations. The latter manifest themselves after the light sensitive paper has been developed as a plurality of channels or streaks, each channel or streak representing a loss of information across its width and breadth.

It is an object of the present invention to provide a copying device employing an optical transfer device comprising a plurality of light conducting plates in parallel relationship which will prevent striations from appearing on the finished and developed copying paper in spite of structural imperfections which may be present in the optical transfer device itself.

It is a further object of the present invention to provide a copying machine employing an optical image transfer device comprising a plurality of light transmitting plates arranged in parallel relationship wherein the optical image transfer device is reciprocated along its longitudinal axis and normal to the plates to thereby nullify the effect of optical flaws which may be present in the image transfer device.

These and other advantages and objects from the practice of this invention will be apparent from the following.

In the drawings:

FIG. 1 is a partially schematic end view of a copying machine whose main optical element comprises a plurality of light transmitting plates arranged in parallel relationship.

FIG. 2 is a view taken along line 2—2 of FIG. 1.
FIG. 3 is a view taken along line 3—3 of FIG. 2.

Referring now to FIG. 1 of the drawings, an endless belt 40 is mounted between a drive roll 42 and an idler roll 44. A complementary belt 46 is mounted in spaced relationship to the belt 40 between a drive roll 48 and an idler roll 50. Drive roll 42 for belt 40 is connected to the output shaft of a motor 56 by an endless chain 52 which passes about a sprocket 54 mounted on the output shaft of the motor. The shaft of roll 42 also has secured thereto a sprocket 58 corresponding in size to sprocket 60 carried by drive roll 48 of belt system 46.

An endless chain 62 passes about sprockets 58 and 60 whereby upon actuation of the motor 56 to drive the chain 52 in the direction of the directional arrow, the drive pulley 42 is rotated, thereby moving the endless belt 40 in the indicated direction. Simultaneously, endless belt 46 is urged in the direction of the directional arrows through the medium of the sprockets 58 and 60 and chain 62.

The assembly may also include an infeed idler roll 66 for material to be copied, indicated as sheet 68, and an output roll 70 for said sheet material. Similarly, the upper endless belt 46 is in cooperative engagement with an infeed roll 72 and an output roll 74. The upper flight may also include a plurality of idler rolls generally designated 76 for supporting the sheet or web of material 78 to which an image of the indicia on the original document 68 is to be transferred.

Positioned between the upper flight 80 and the lower surface 82 of endless belt 46 is the optical transfer device 10' with the image-receiving surface 20 facing in close parallel alignment with the indicia-containing surface of the sheet 68. The device 10' is formed of a plurality of light transmitting plates 14 optically insulated from each other by coextensive plates 12 of a material of lower index of refraction, as set forth in application Serial No. 154,648. The image-emergence surface 22 of the optical device 10' is positioned in close parallel relationship to the, for example, light sensitive surface of the sheet or web 78.

The assembly also includes a source of light 84 which may be provided with a suitable reflector 86 for directing light to the light-receiving surface 30.

Mounted on the left longitudinal face of the optical transfer device 10' as by adhesive or any convenient manner, is a pair of slide rails 130 and 132 which project into and are slidably received by a pair of supporting rails 134 and 136, respectively. The support rails are suitably mounted to any convenient fixed support of the copying machine. Referring now to FIGS. 2 and 3 of the drawings, the numeral 138 designates a plate suitably affixed, as by adhesive, to the end of the transfer device 10' and includes a pair of ears 140 fixed thereto between which is pivotally mounted one end of a lever 142 whose midpoint is pivoted to a fixed support as denoted by the numeral 144. As best shown at FIG. 3, the lower portion of lever 142 carries a cam following surface 146 which engages a disk 148 eccentrically mounted on the output shaft of preferably a variable speed motor 150.

In operation of the device, material 68 to be copied is fed into the device between rolls 44 and 66 while the sheet material adapted to receive the transferred image is fed into the machine between rolls 48 and 62 whereby the original document and the copy receiving web move in opposite directions past the image transfer optical device 10'. The opposite movement of the original and the copy webs provides for mirror image reversal while the optical properties of the element 10' bring about end-to-end reversal of the image to provide sharp high speed direct positive copying as described in detail in application Serial No. 154,648.

In operation, as described in the foregoing paragraph, a flaw present in the optical transfer device 10' will result in a streak or streaks (striations) on the light sensitive copying paper or sheet 78. Not only are such streaks esthetically undesirable, but they represent, in a strict sense, a distinct loss of information which could be critical in certain reproductions.

In the photographic arts, it is well known that if a certain light sensitive film requires an optimum exposure time, an exposure less than this optimum will nonetheless yield a final reproduction which is distinct, recognizable, and which only suffers slightly from a loss of information. Recognizing this, if the image transfer device 10′ be reciprocated, as illustrated by the heavy arrow in both FIGS. 2 and 3, parallel to the longitudinal axis thereof while the reproduction is being made, the optical anisotropy arising from a flaw or flaws in the optical transfer device 10′ will be distributed over a width of the sensitive paper equal to the amplitude of the reciprocation. Since the copy paper is moving and hence has only a finite time to receive light from the image, the effect of the reciprocation is to distribute the effect of the optical flaw transversely of the copy paper and thereby to diminish the effective exposure time. Thus, by way of example, if a certain area of the copy paper is six plate widths wide, and one of the six plates transmits no light, then the area will receive five-sixths of the light it would have received had all six plates been perfect. By making a proper selection of the rate of reciprocation, dependent upon the sensitivity of the copying paper and the speed which it travels through the copying machine, no striations will appear in the finished reproduction and the loss of exposure time is generally so slight as to be unnoticeable in the finished product. A reciprocation rate of about ½ the exposure rate of the sensitive paper will provide satisfactory results. Generally, the amplitude of reciprocation is at least the width of one of the light transmitting plates 14. The greater the amplitude of reciprocation, the greater the area over which the effect of an optical flaw is distributed and the greater the attenuation of such effect in the copy.

It will be apparent that upon rotation of motor 150, the disk 148 will cause the indicated reciprocation of the optical transfer member 10′ through the linkage and support scheme illustrated at FIGS. 2 and 3 of the drawings. Preferably, a spring abuts the opposite face of cam follower surface 146 to cause the latter to follow the surface of disk 148 when the lever 142 is executing clockwise motion in FIG. 3.

I claim:

In a copy reproducing device, a transfer member comprising a plurality of light-transmitting plates in parallel arrangement with a material of lower index of refraction than said plates between opposed surfaces of said plates and coextensive therewith, spaced parallel light-receiving and light-emitting surfaces in normal arrangement to the planes of said opposed surfaces, means for supporting an object to be copied in the optical path of the light-receiving surface of said image transfer member, means for supporting an image-receiving member in the optical path of the image-emitting surface of said image transfer member, means for causing relative opposite movement between the object to be copied and the image receiving member, and means for reciprocating said transfer member in a direction normal to the plane of said plates with an amplitude equal to at least the maximum thickness of any of the said plates.

References Cited by the Examiner
UNITED STATES PATENTS

| 2,588,373 | 3/52 | Erban | 88—57 X |
| 3,016,785 | 1/62 | Kapany | 88—1 |
| 3,060,805 | 10/62 | Brumley | 88—24 |
| 3,060,806 | 10/62 | Lewis et al. | 88—24 |
| 3,110,762 | 11/63 | Frank | 88—1 |
| 3,125,013 | 3/64 | Herrick et al. | 95—75 |

EVON C. BLUNK, *Primary Examiner.*